A. C. MILLER.
WAX EXTRACTOR.
APPLICATION FILED APR. 26, 1905.
905,732.
Patented Dec. 1, 1908.
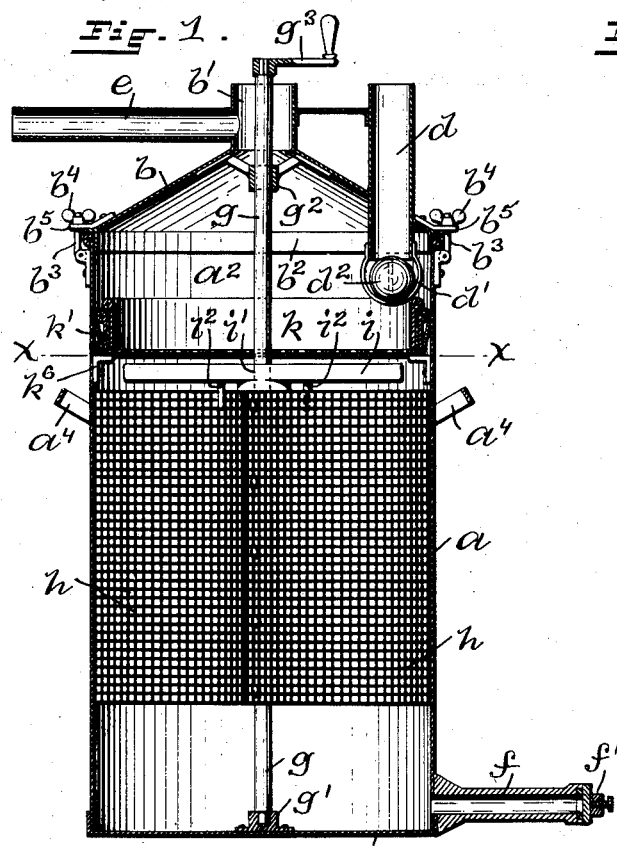
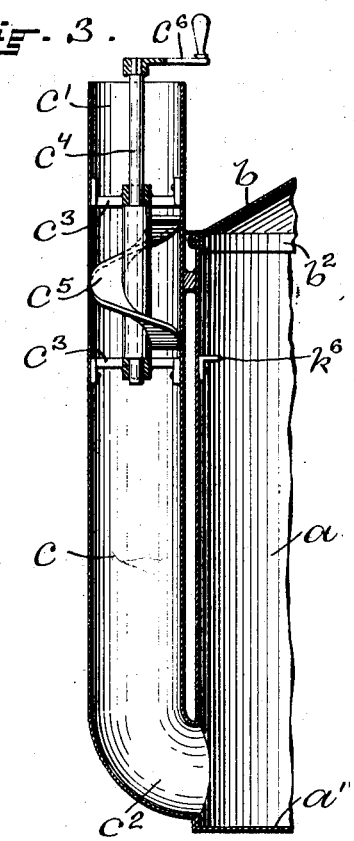
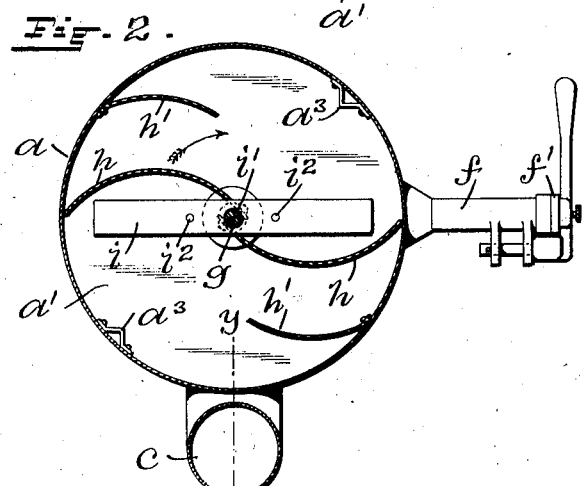
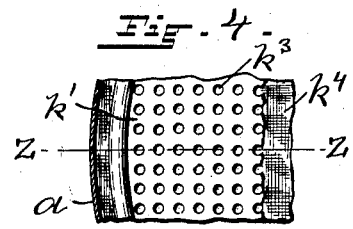
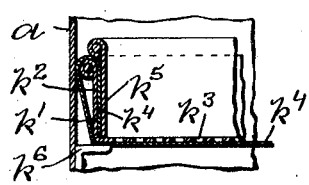
WITNESSES:
Chas. H. Luther Jr.
Ada E. Hagerty
INVENTOR:
Arthur C. Miller
by Joseph A. Miller Jr.
ATTORNEY.

UNITED STATES PATENT OFFICE.

ARTHUR C. MILLER, OF PROVIDENCE, RHODE ISLAND.

WAX-EXTRACTOR.

No. 905,732.　　　　Specification of Letters Patent.　　　　Patented Dec. 1, 1908.

Application filed April 26, 1905. Serial No. 257,513.

*To all whom it may concern:*

Be it known that I, ARTHUR C. MILLER, a citizen of the United States, residing at Providence, in the county of Providence and State of Rhode Island, have invented a new and useful Improvement in Wax-Extractors, of which the following is a specification.

This invention has reference to an improved apparatus for extracting wax from honeycombs after the honey has been removed from the combs.

The object of my invention is to extract the wax from the combs more perfectly and expeditiously than has heretofore been done.
A further object of my invention is to provide an apparatus in which the operation of extracting the wax from the combs may be continuous or not as desired.

A still further object of my invention is to provide an apparatus that will extract the wax from the combs by the application of mechanical means, water and heat, and deliver the wax from the top of the apparatus in a practically pure condition, the sediment and refuse settling to the bottom of the apparatus from which it is removed through an outlet duct controlled by a valve.

My invention consists in the peculiar and novel construction of an apparatus for extracting wax from honeycombs in a practically pure condition by the application of water, heat, and mechanical means, with details of construction in the apparatus, as will be more fully set forth hereinafter.

Figure 1 is a vertical sectional view taken centrally through the apparatus, showing the construction of the same. Fig. 2 is a transverse sectional view taken on line X X of Fig. 1 through the apparatus. Fig. 3 is a vertical detail sectional view taken on line Y Y of Fig. 2 through the worm feed of the apparatus. Fig. 4 is an enlarged detail view of part of the apparatus and strainer looking down on the same and showing the perforated bottom of the strainer, and Fig. 5 is a detail sectional view taken on line Z Z of Fig. 4, showing the means for securing the strainer cloth to the strainer.

In the drawings, $a$ indicates the cylindrical body, $b$ the conical cover, $c$ the comb feed inlet duct, $d$ the water inlet pipe, $e$ the wax outlet pipe, $f$ the sediment outlet duct, $g$ the vertical operating shaft, $h$ $h$ the flexible wire screen breakers, $i$ the clearer bar, and $k$ the strainer of my improved apparatus for extracting wax from combs.

The cylindrical body $a$ is constructed from sheet metal to have the closed bottom $a'$, and the open top $a^2$. The vertical V-shaped ribs $a^3$ $a^3$ are secured to the inside of the body $a$, and the handles $a^4$ $a^4$ are secured to the outside of the body $a$ in a convenient position for handling the apparatus. The conical cover $b$ is constructed to have the central vertical cylindrical extension $b'$ from which extends the horizontal outlet pipe $e$, the usual flange $b^2$, and the vertical water inlet pipe $d$ which extends through the cover and has on its lower end the wire basket $d'$ loosely holding the hollow ball valve $d^2$, as shown in Fig. 1. The cover is shaped to fit the open end $a^2$ of the apparatus to which it is tightly secured by the fastening bolts $b^3$ $b^3$. These bolts are pivotally secured to the body $a$ and have the thumb nuts $b^4$ $b^4$. A plurality of forked lugs $b^5$ $b^5$ are secured to the cover in a position to engage with the bolts $b^3$ $b^3$ which pass through the forked ends of the lugs, and are secured to the lugs by the thumb nuts $b^4$ $b^4$, as shown in Fig. 1. By tightening the thumb nuts $b^4$ $b^4$ on the lugs the cover is forced tightly onto the open end $a^2$ of the apparatus, and by loosening the thumb nuts the cover may be easily removed.

The comb feed inlet duct $c$ consists of a vertical tube having the open top $c'$ and the curved lower end $c^2$ which opens into the body $a$ of the apparatus adjacent the bottom, as shown in Fig. 3. The inlet duct is secured to the outside of the body $a$ and has the internal bearings $c^3$ $c^3$ supporting the vertical shaft $c^4$. A worm $c^5$ is secured to the shaft $c^4$ between the bearings $c^3$ $c^3$, and a crank $c^6$ is removably secured to the upper end of the shaft $c^4$.

The sediment outlet duct $f$ extends from the outside of the body $a$ adjacent the bottom and has the valve $f'$ on its outer end, as shown in Figs. 1 and 2. The vertical operating shaft $g$ is supported at its lower end in the bearing $g'$ secured to the bottom $a'$ and in the bearing $g^2$ secured to the cover $b$. This shaft extends upwardly through the cylindrical extension $b'$ of the cover and has the crank $g^3$ removably secured to the upper end, as shown in Fig. 1. The flexible breakers $hh$ are each secured at one edge to the operating shaft $g$, the free ends of the breakers bearing on the inner surface of the body $a$, as shown in Figs. 1 and 2. The flexible wings $h'$ $h'$ are each secured at one edge to the inner surface of the body $a$, the free ends extending into the body of the apparatus, as shown in Fig. 2. The breakers and wings are constructed preferably of wire screen. The clearer bar $i$ has the central hole $i'$ for the shaft $g$ and the downwardly-extending pins $i^2$ $i^2$ which engage with the breakers $h$ $h$. The clearer bar $i$ is loosely supported on the shaft $g$ and is constructed from some light substance (such as wood) that has a specific gravity lighter than water or oil.

The strainer $k$ comprises a sheet metal circular pan $k'$ having the cylindrical side wall $k^2$, the perforated bottom $k^3$ and a central hole for the shaft $g$. A cloth $k^4$ is placed over the perforated bottom $k^3$ carried up and over the side wall $k^2$ to the inside of the side wall where it is secured by forcing the cylindrical ring $k^5$ over the cloth, as shown in Fig. 5. The strainer $k$ is held in the body of the apparatus above the clearer bar $i$ by the brackets $k^6$ $k^6$ secured to the inside of the body $a$, as shown in Figs. 1 and 5.

In the operation of my improved apparatus for extracting wax from honeycombs the body $a$ is filled approximately to the top of the breakers $h$ $h$ with water and broken honeycomb. The strainer $k$ is placed into position on the brackets $k^6$ $k^6$ and the cover $b$ tightly secured in place by tightening the thumb nuts $b^4$ $b^4$ on the lugs $b^5$ $b^5$. Heat is now applied to the bottom $a'$ of the apparatus to heat the water and the crank $g^3$ turned to the right, thus revolving the breakers $h$ $h$ and the clearer bar $i$ in the direction of the arrow, the breakers $h$ $h$ on the shaft $g$ will be brought in contact with the breakers or wings $h'$ $h'$ on the body $a$ acting to depress the same, or both sets of breakers may be of such a spring nature that they will both give, more or less, when in contact so that the material will be disintegrated between the breakers as shown in Fig. 2. This agitates the mass of hot water and comb and disintegrates the comb between the breakers $h$ $h$ and the wings $h'$ $h'$ assisted by the vertical ribs $a^3$ $a^3$ and the heat of the water. When the water reaches the required temperature the wax rises to the surface of the water in the form of oil and the extraneous substances settle to the bottom of the apparatus from which they are removed through the outlet duct $f$. The apparatus is now supplied with broken comb through the inlet duct $c$ by turning the handle $c^6$ to the right. This revolves the worm $c^5$ and forces the broken comb into the body $a$ of the apparatus below the breakers $h$ $h$. The wax now rises in the form of oil through the strainer $k$ into the cover $b$ and flows out through the outlet pipe $e$. As the wax in the form of oil rises in the body $a$, the hollow ball valve $d^2$ floating on the oil rises and closes the inlet pipe $d$, at the same time the clearer bar $i$ by reason of its being lighter than the oil rises and is forced against the cloth $k^4$. As the clearer bar revolves with the shaft $g$ it scrapes off any pieces of comb which may collect on the cloth and prevents the same from clogging the cloth. When the operation is continuous, water is added when required through the inlet pipe $d$, the ball valve $d^2$ opening automatically and allowing the water to enter the body $a$ of the apparatus.

It is evident that a packing could be used between the cover $b$ and the open end $a^2$ of the body $a$ if required and that pulleys could be secured to the upper ends of the shafts $c^4$ and $g$ without materially affecting the spirit of my invention.

Having thus described my invention, I claim as new and desire to secure by Letters Patent;—

1. An apparatus for extracting wax from honeycombs comprising a cylindrical body having a closed bottom and a conical top, an outlet pipe from the conical top, an outlet pipe from the bottom, wings secured to the inside of the cylindrical body, an operating shaft, breakers secured to the operating shaft and adapted to contact with the breakers on the body to depress the same, a clearer bar on the operating shaft, a strainer above the clearer bar, means for supporting the operating shaft in the cylindrical body in a position to extend centrally through the conical top, means for revolving the operating shaft, and means for supplying water and honeycomb to the cylindrical body, whereby with the application of heat the wax is extracted from the comb and flows through the outlet pipe in the conical top in the form of oil, as described.

2. An apparatus for extracting wax from honeycombs comprising a cylindrical body having a closed bottom and a conical top, an outlet pipe from the conical top, an inlet pipe in the conical top for supplying the apparatus with water, an outlet duct from the cylindrical body adjacent the bottom, an operating shaft, breakers secured to the operating shaft, flexible wings secured to the inside of the cylindrical body, a clearer bar on the operating shaft, a strainer above the clearer bar, means for supporting the operating shaft in the cylindrical body in a position to extend centrally through the conical top, means for revolving the operating shaft, a comb feed inlet duct entering the cylindrical body adjacent the bottom, a shaft supported in bearings in the inlet duct, a worm on the shaft, and means for revolving the worm shaft, whereby with the application of heat the wax is extracted from the comb and flows through the outlet pipe in the conical top in the form of oil, as described.

3. An apparatus for extracting wax from honeycombs comprising a cylindrical body having a closed bottom and an open top, a conical cover, means for securing the cover to the open top, an outlet pipe from the conical cover, an inlet pipe in the cover for supplying the apparatus with water, an automatic valve on the inner end of the inlet pipe, an outlet duct from the cylindrical body adjacent the bottom, an operating shaft, flexible breakers secured to the operating shaft, flexible wings secured to the inside of the cylindrical body in a position to engage with the breakers on the shaft, a strainer, a clearer bar on the operating shaft adapted to engage with the bottom of the strainer, means for supporting the operating shaft in the cylindrical body in a position to extend centrally through the cover, means for revolving the operating shaft, a comb feed inlet duct entering the cylindrical body adjacent the bottom, a shaft supported in bearings in the inlet duct, a worm on the shaft, and means for revolving the worm shaft, whereby the comb is fed to the cylindrical body and with the application of heat the wax is extracted from the comb and flows through the outlet pipe in the cover in the form of oil, as described.

4. In an apparatus for extracting wax from honeycombs, the combination with a cylindrical body $a$ having the closed bottom $a'$ and the outlet duct $f$, a conical cover $b$ having the outlet pipe $e$ and the inlet pipe $d$, of a shaft $g$, breakers $h\ h$ in the form of wire screens secured to the shaft, wings $h'\ h'$ in the form of wire screens secured to the inside of the body $a$, means for supporting the shaft $g$ in a position to extend centrally through the cover $b$, means for revolving the shaft $g$, and means for forcing honeycomb into the body $a$ of the apparatus, as described.

5. In an apparatus for extracting wax from honeycombs, the combination of a cylindrical body $a$ having the closed bottom $a'$, the outlet duct $f$ with the valve $f'$, a conical cover $b$ having the outlet pipe $e$, the inlet pipe $d$, the ball valve $d^2$ on the inner end of the inlet pipe $d$, means for securing the cover $b$ to the body $a$, a comb feed inlet duct $c$ extending into the side of the body $a$ adjacent the bottom $a'$, bearings $c^3\ c^3$ in the inlet duct $c$, a shaft $c^4$ in the bearings, a worm $c^5$ on the shaft, means for revolving the shaft $c^4$, a shaft $g$, means for supporting the shaft $g$ in a position to extend centrally through the cover $b$, means for revolving the shaft $g$, breakers $h\ h$ secured to the shaft $g$, wings $h'\ h'$ secured to the inside of the body $a$, a clearer bar $i$ having the pins $i^2\ i^2$ on the shaft $g$, and a strainer $k$ above the clearer bar $i$ comprising a circular pan $k'$ having the side wall $k^2$ and the perforated bottom $k^3$, a cloth $k^4$, and a ring $k^5$, whereby water and honeycombs are fed to the apparatus and with the application of heat the wax is extracted from the comb and flows through the outlet pipe $e$, as described.

6. In an apparatus of the nature described, the combination with the body, of the apparatus having a bottom and a top and wings or breakers secured to the inner sides of the body, of a rotatable shaft, wings or breakers supported on the shaft and adapted to contact with the wings or breakers on the sides of the body.

7. In an apparatus of the nature described, the combination with a cylindrical body having a closed bottom, breakers supported on the sides of the body, and a strainer, of a shaft, breakers secured to the shaft and adapted to contact with the breakers on the body to depress the same, a clearer bar on the shaft under the strainer, means for supporting the shaft in position to extend centrally through the strainer, and means for rotating the shaft.

8. In an apparatus of the nature described, the combination with a cylindrical body having a body and top, an outlet pipe, breakers secured to the inner sides of the body, means for supplying material to the apparatus, and means for removing the resulting product, of a rotatable shaft supported centrally in the body, breakers supported by the shaft and adapted to contact with the breakers on the body to depress the same, substantially as described.

In testimony whereof I have signed my name to this specification in the presence of two subscribing witnesses.

ARTHUR C. MILLER.

Witnesses:
ADA E. HAGERTY,
J. A. MILLER, Jr.